United States Patent
Winner et al.

(10) Patent No.: US 6,878,096 B1
(45) Date of Patent: Apr. 12, 2005

(54) METHOD AND DEVICE FOR SECURING THE STANDSTILL OF A VEHICLE, NOTABLY IN CONJUNCTION WITH A VEHICLE SPEED CONTROL

(75) Inventors: Hermann Winner, Karlsruhe (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,762
(22) PCT Filed: May 8, 1999
(86) PCT No.: PCT/DE99/01389
§ 371 (c)(1), (2), (4) Date: Feb. 27, 2001
(87) PCT Pub. No.: WO00/12365
PCT Pub. Date: Mar. 9, 2000

(30) Foreign Application Priority Data

Aug. 27, 1998 (DE) .......................................... 198 38 885

(51) Int. Cl.⁷ ............................................. B60K 41/26
(52) U.S. Cl. ..................... 477/94; 477/186; 477/187; 701/96
(58) Field of Search .................. 677/92, 94, 163, 677/164, 185, 186, 187, 199, 200; 192/200.1; 701/96, 104

(56) References Cited

U.S. PATENT DOCUMENTS

| | | | | |
|---|---|---|---|---|
| 3,036,677 A | | 5/1962 | Pracher | |
| 4,262,783 A | * | 4/1981 | Scarrott et al. | 477/94 |
| 4,273,224 A | * | 6/1981 | Brown et al. | 192/220.1 |
| 4,562,906 A | * | 1/1986 | Barbagli et al. | 192/220.1 |
| 4,684,177 A | | 8/1987 | Ha | |
| 5,052,531 A | * | 10/1991 | Bota | 192/220.1 |
| 5,135,291 A | | 8/1992 | Hee | |
| 5,420,792 A | * | 5/1995 | Butsuen et al. | 701/96 |
| 5,646,841 A | * | 7/1997 | Suzuki et al. | 477/186 |
| 5,771,007 A | * | 6/1998 | Arai et al. | 901/96 X |
| 5,772,553 A | * | 6/1998 | Tsukamoto et al. | 477/92 |
| 5,781,103 A | * | 7/1998 | Gilling | 701/96 X |
| 5,910,067 A | * | 6/1999 | Vandendriessche et al. | 477/92 |
| 6,044,321 A | * | 3/2000 | Nakamura et al. | 701/96 |

FOREIGN PATENT DOCUMENTS

DE 4338399 5/1995

* cited by examiner

Primary Examiner—Ha Ho
(74) Attorney, Agent, or Firm—Walter Ottesen

(57) ABSTRACT

A method and an arrangement for ensuring the standstill of a vehicle, especially in combination with a control of the speed of the vehicle, are suggested, wherein a braking force is built up to realize a parking brake when standstill of the vehicle is detected and/or a transmission is switched into the park position. The brake force or the transmission position is also maintained when the supply voltage for the electrical systems of the vehicle is switched off.

8 Claims, 4 Drawing Sheets

FIG.4
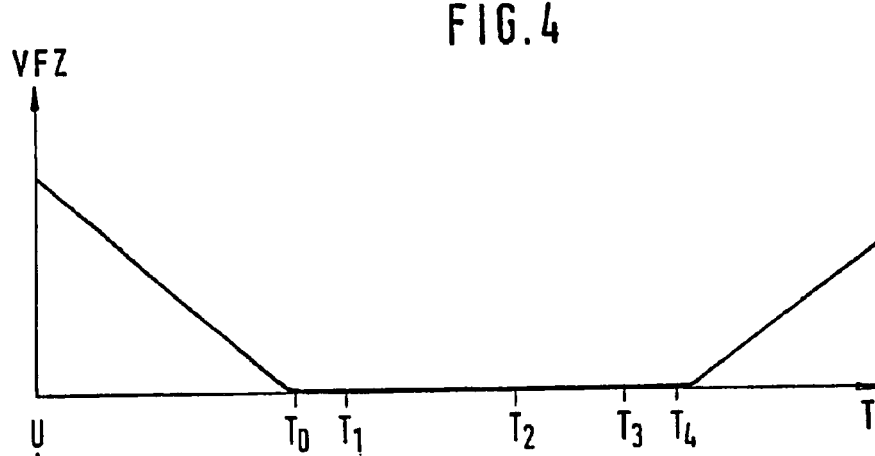
FIG.4a
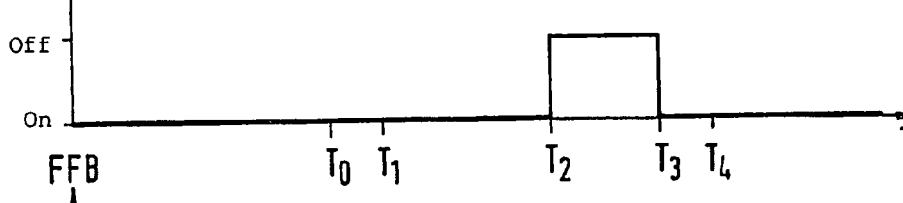
FIG.4b
Fig.4c
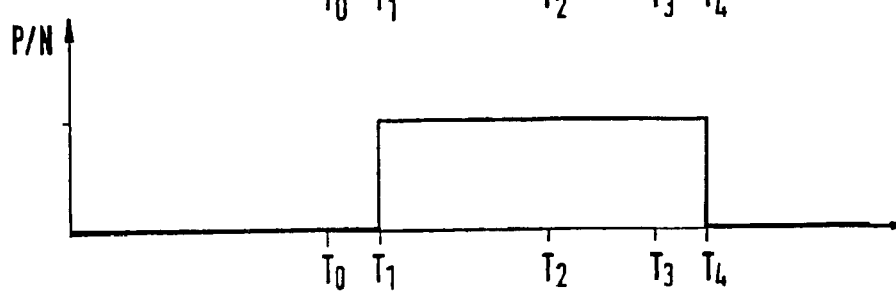
Fig.4d
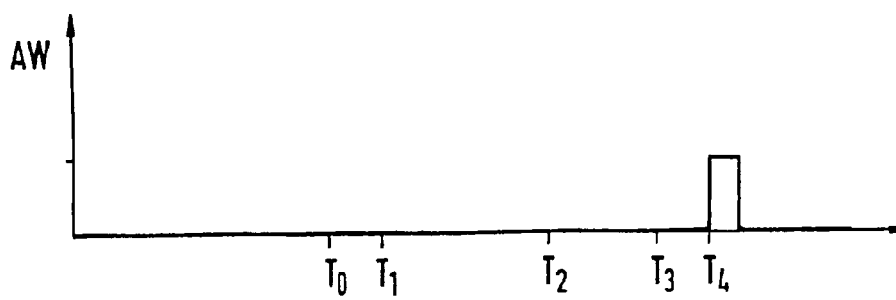
Fig.4e

US 6,878,096 B1

METHOD AND DEVICE FOR SECURING THE STANDSTILL OF A VEHICLE, NOTABLY IN CONJUNCTION WITH A VEHICLE SPEED CONTROL

This application is the national stage of PCT/DE 99/01389, filed May 8, 1999, designating the United States.

FIELD OF THE INVENTION

A The invention relates to a method and an arrangement for ensuring the standstill of a vehicle, especially in combination with a control of the speed of the vehicle.

BACKGROUND OF THE INVENTION

A method and an arrangement for ensuring the standstill of a vehicle is known, for example, from EP 375 708 B1 (U.S. Pat. No. 5,129,496). There, the standstill of the vehicle is derived on the basis of the wheel speed signals whereupon a braking force is built up at at least one of the wheel brakes in the sense of a parking brake function. This parking brake function is, however, switched off when the driver switches off the voltage supply for the vehicle control systems. A certainty as to standstill is therefore only guaranteed when the supply voltage is switched on.

It is a task of the invention to provide measures which ensure the standstill of a vehicle for each case.

The SAE paper number 96 10 10 (Adaptive Cruise Control, System Aspects and Development Trends, 1996, by Hermann Winner, Stefan Witte, Werner Uhler and Bernd Lichtenberg) shows a speed control while considering the distance to the vehicle traveling ahead. Here, the driver inputs the desired speed of the vehicle via an operator-controlled lever with the usual functions of road speed controllers. This desired speed is controlled comparable to a conventional road speed controller when there is no vehicle present ahead. A desired acceleration is computed from the difference between the desired speed and the driving speed and this acceleration is made available for controlling the drive unit of the vehicle. If a radar system detects a vehicle traveling ahead, then the distance and relative speed to this vehicle are determined. The control task comprises to control the relative speed to zero and, simultaneously, maintain a speed-dependent desired distance. Parameters for determining the desired distance can be set by the driver. This so-called follow-on controller likewise determines a desired acceleration from the above-mentioned quantities. The desired acceleration values can also be negative so that they correspond to deceleration desired values. These are adjusted by influencing the engine of the vehicle and/or the brakes.

Correspondingly, U.S. Pat. No. 5,794,735 shows a road speed controller which inputs a desired acceleration of the vehicle on the basis of the difference between the desired and actual speeds. This desired acceleration is adjusted by controlling the engine and/or by actuating the wheel brakes of the vehicle.

In road speed controller systems of this kind, it can happen that the vehicle is braked to standstill. Here too, it is necessary to make available a guarantee of this standstill.

From U.S. Pat. No. 6,053,584, a procedure is known with the aid of which a comfortable braked stopping of the vehicle is made possible. The braking force at the wheels is reduced somewhat in order to reduce the stopping jolt when there is a drop of a specific vehicle speed in the region of the standstill speed.

SUMMARY OF THE INVENTION

The solution in accordance with the invention makes available a safeguard as to standstill which remains active even after the supply voltage is switched off. An unintended release of the standstill latching is thereby precluded. The use of a parking brake having an electromotoric actuator is especially advantageous. The actuator then remains in the position assumed at the end of its driving and is only brought back to its start position by a renewed, releasing drive signal. Correspondingly, a parking brake can be provided which is actuated on a hydraulic or pneumatic basis. In this parking brake, the controlled pressure means is latched and the braking action is maintained and only released when there is a releasing drive signal.

It is especially advantageous that the standstill safeguard is only released when the driver inputs a corresponding drive command by actuating the operator-controlled element.

The connection of this standstill safeguard function with a road speed controller is of special advantage, especially with the initially mentioned adaptive road speed controller which can brake the vehicle to standstill. At least after a predetermined time after reaching standstill, the standstill is ensured by the automatic latching of a parking brake. Switching off the supply voltage does not lead to an unintentional release of the assurance.

In vehicles having an automatic converter transmission and when the parking brake is actuated at standstill, it is of special advantage, for reducing the consumption of fuel, that the transmission is controlled to the neutral position or a controllable clutch is interrupted in order to interrupt the force flow between the drive unit and the vehicle wheels.

It is especially advantageous when the transmission automatic for the standstill safeguard is controlled into the park position after the standstill of the vehicle. This can be carried out for interrupting the force flow or also as a substitute for the parking brake to ensure the standstill of the vehicle. Here, this position, as in the case of the parking brake, is retained in an advantageous manner when the supply voltage is switched off.

BRIEF DESCRIPTION OF THE DRAWINGS

The invention will be explained in greater detail in the following with respect to the embodiments shown in the drawing.

FIG. 4 shows time diagrams on the basis of which a preferred realization of the solution of the invention is shown. In addition to the application in the preferred embodiment for an adaptive road speed controller, the illustrated solution is also used in all areas of application in which the vehicle is guided into standstill, for example, on the basis of a brake pedal actuation of the driver, of other automatic braking operations, et cetera.

The solution of the invention is described hereinafter based on the preferred application of an adaptive road speed controller without this embodiment limiting the area of application of the described solution as mentioned above.

Figure 1:
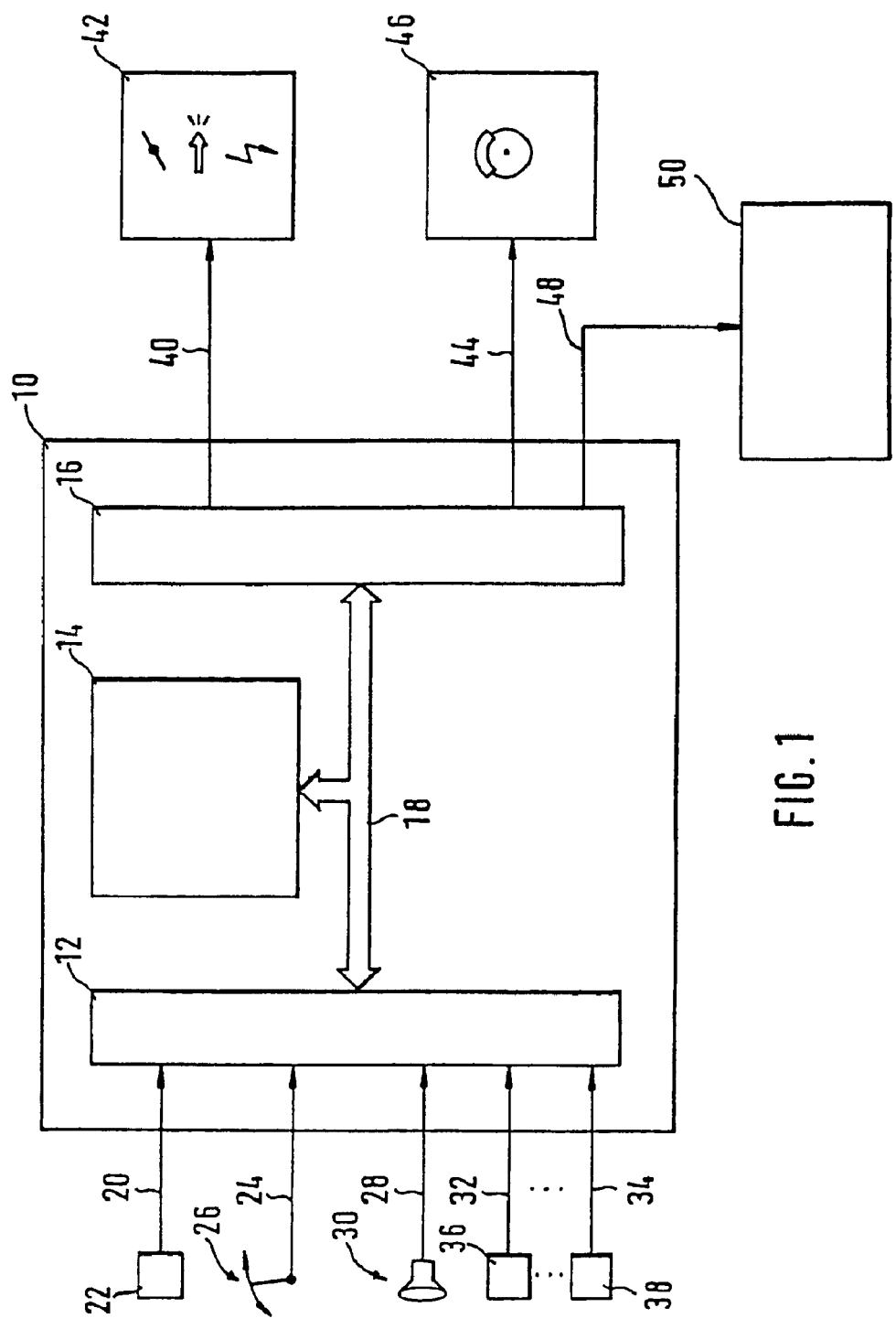
FIG. 1 shows an overview circuit diagram of a control unit for controlling the speed of a vehicle which is explained in greater detail in FIG. 2 with respect to an example of an adaptive road speed controller.

FIG. 1 shows an overview circuit diagram of a control unit 10 for an adaptive road speed controller. The control unit 10 includes an input circuit 12, at least one microcomputer 14 and an output circuit 16. These elements are connected to each other via a communication system 18 for exchanging data and information. The following are connected to the input circuit 12: input lines 20 from a measuring device 22 for detecting the road speed; an input line 24 from an operator controlled element 26, which is actuable by the driver, for inputting the operating state of the road speed controller and the desired distance; and, an output line 28 from a distance measuring unit 30, preferably a radar apparatus. Furthermore, additional input lines 32 to 34 from measuring devices 36 to 38 for detecting additional operating quantities of the vehicle are connected to the input circuit 12. These operating quantities are used in the adaptive road speed control. Such operating quantities are, for example, steering angle, transverse acceleration, et cetera. The control unit 10, there the at least one microcomputer 14, influences the power of the drive unit of the vehicle in the context of the adaptive road speed control via at least one output line 40 and corresponding actuating devices 42 (for example, electronic engine control apparatus). In a preferred embodiment, the control unit 10 influences the braking force at the wheel brakes of the vehicle via the output line 44 and corresponding actuating elements 46 (for example, of a braking system with ABS/ASR elements). In a preferred embodiment, a control unit 50 for controlling an automatic transmission and/or an electrically controllable clutch are driven via an output line 48.

Figure 2:
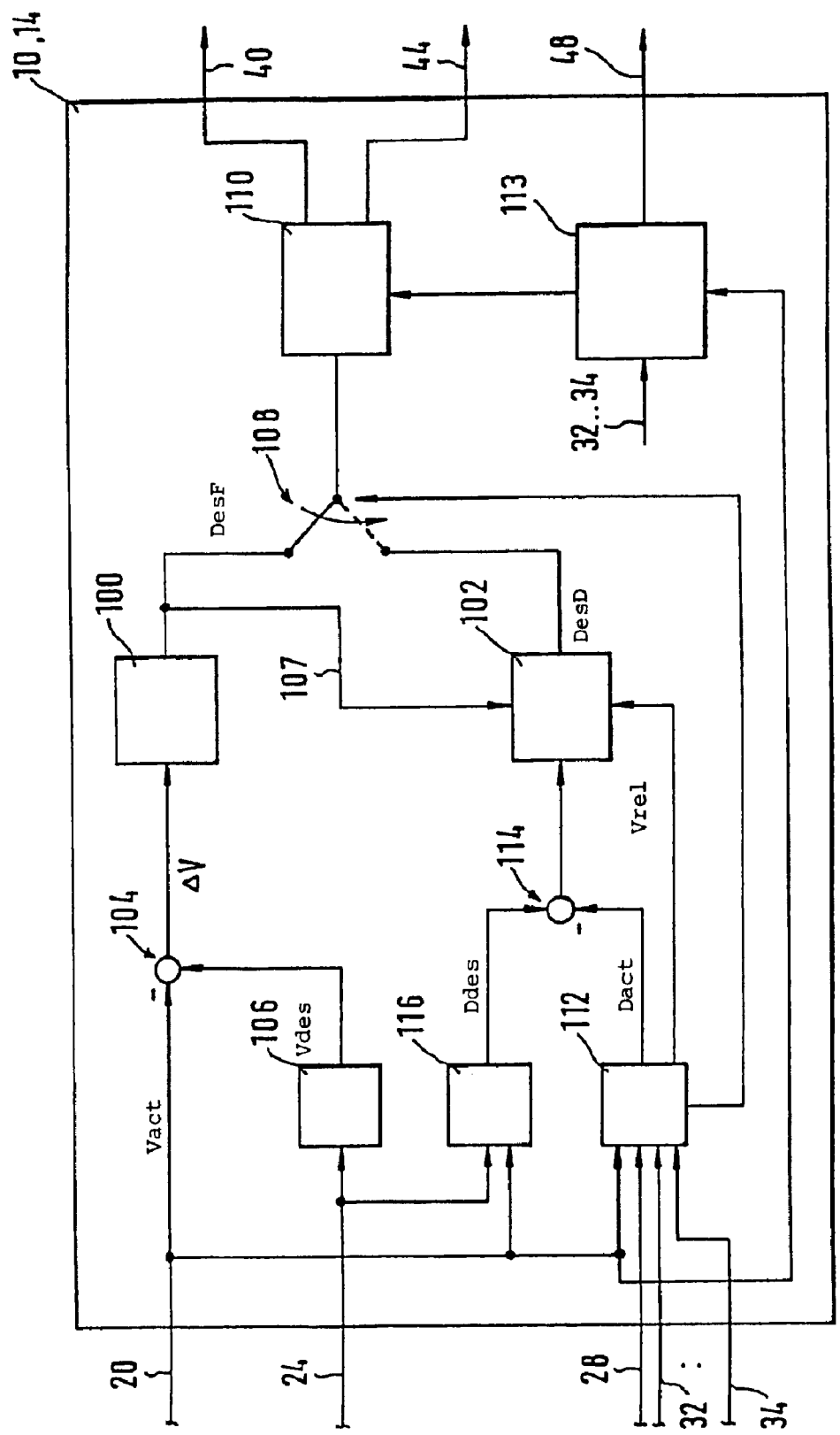

The basic principle of the adaptive road speed control, which is known from the state of the art initially mentioned herein, is presented in FIG. 2 with respect to a sequence diagram which shows the basic interrelationships for the adaptive road speed control. The realization of the road speed control takes place in the preferred embodiment as a program of the microcomputer 14 via which the interrelationships shown in FIG. 2 are realized.

The illustrated adaptive road speed controller has two basic functions, namely, the road speed controller 100 and the distance controller 102. The difference $\Delta V$ between the desired speed $V_{des}$ and the actual speed $V_{act}$ is supplied from a comparator position 104 to the road speed controller 100 realized in a conventional manner. The desired speed $V_{des}$ is determined in dependence upon the operating state of the operator-controlled element 26 in a selection stage 106. Thus, for example, in the operating state "set", the current actual speed value is assumed as the desired speed and, in the operating state "acceleration", ramps of the desired speed, which change as a function of time, are pregiven, et cetera. The output signal desF is formed by the road speed controller 100 in dependence upon the speed difference in accordance with a pregiven control strategy (for example. PD control). The output signal desF is outputted to a switching element 108 and via the line 107 to the controller 102.

Depending upon the switch position, the switching element conducts the output signal desF of the road speed controller or the output signal desD of the distance controller to a selection stage 110. The selection stage forms a control signal, which is dependent upon the supplied output signal, for influencing the engine power (output line 40) or the braking force (output line 44). The distance control includes a selection stage 112 which determines the relevant vehicle which is to be used as a forward vehicle for distance control in dependence upon: the radar signals supplied via the input line 28; the actual speed; and other quantities supplied via the lines 32 to 34. These quantities include, for example, steering angle, yaw rate and acceleration of the vehicle. The course of the vehicle, which is to be expected, is determined based on the speed and the steering angle and/or the yaw rate. The radar sensor supplies the distance to the detected objects, the relative speed thereof and the angle to the various objects so that the relevant vehicle is selected from a comparison of the supplied data with the course of the vehicle which is to be expected in the future. Then, the values determined by the radar sensor for the spacing to the relevant vehicle $D_{act}$ and its relative speed $V_{rel}$ are outputted. The actual distance is supplied to a comparison stage 114 wherein the difference between the desired distance $D_{des}$, which is pregiven by the driver, and the determined actual distance is formed and supplied to the distance controller 102. The relative speed is transmitted to the distance controller 102 from the selection stage 112. The desired distance to the relevant forward traveling vehicle is determined in a selection stage 116 in dependence upon an actuating signal of the driver and the actual speed which fixes the desired time interval to the forward traveling vehicle in seconds. The distance controller 102 forms an output signal desD with which the distance difference as well as the relative speed of the forward traveling vehicle is brought toward zero. The output signal desD is supplied to the switching element 108. The switching element is switched over into the position shown in phantom outline when a forward traveling vehicle has been detected to which the distance is to be adjusted. This means that the road speed controller 100 determines engine power and brake power in accordance with its input quantities when no vehicle has been determined for distance control, whereas, for a detected forward traveling vehicle, the distance controller 102 controls engine power and brake power. The selection stage 110 decides whether the engine control or the braking control is activated in dependence upon the supplied desired value which essentially corresponds to a desired acceleration or deceleration. If a reduction of the engine power to maintain the desired deceleration is insufficient, then the brakes are activated; otherwise, the deceleration control is carried out via a control of the engine power.

To improve the use for the driver, it is desirable that a road speed controller of this kind can brake the vehicle to standstill. For this reason, a standstill detection 113 is provided in accordance with FIG. 2 which determines, at least on the basis of the road speed actual signal VACT, the standstill of the vehicle as well as an operational state which lies directly ahead of the standstill of the vehicle. If the standstill detection 113 determines (for example, via a drop below a pregiven speed limit value) that the vehicle is in the region of standstill, then a corresponding piece of data is outputted to the selection stage 110. In this case, the brake system is controlled via the output line 44, for example, as in the initially mentioned state of the art for controlling the stopping braking operation. If the standstill detection 113 recognizes (for example, on the basis of an extrapolated speed) the standstill of the vehicle, then a corresponding piece of data is again outputted to the selection stage 110 which leads to the condition that, via the line 44, the braking force at the wheel brakes is built up in the sense of a parking brake function. In a preferred embodiment, this parking brake function is realized by means of an electromotoric actuator operating on at least one wheel brake. The actuator brings friction pads in contact for braking the vehicle and the actuator remains in the assumed position at the ending of the drive, that is, the actuator is latched and the actuator is only brought into its initial position via a renewed releasing drive signal. In another embodiment, a wheel brake is actuated on a hydraulic or pneumatic base in the sense of a parking brake function, wherein the pressure medium is locked in, the braking action is maintained and is only released with a releasing drive signal. In a further solution, the parking brake is actuated via a brake cable. The brake element is pretensioned via a reset device in the parking brake applied position in which friction linings are in contact for braking. From this position, the parking brake is electrically, hydraulically or pneumatically released. The parking brake is automatically tensioned by the reset device when switching off this actuation.

Additionally, or alternatively to the brake force buildup in the sense of a parking brake, a corresponding datum is outputted to the transmission control via the line 48 when a standstill of the vehicle is detected. The transmission control triggers a switching of the transmission into the neutral position or into the park position. The switching of the transmission takes place in a preferred embodiment after a specific time after detecting standstill of the vehicle. A signal is furthermore applied to the standstill detection 113 via at least one of the lines 32 to 34. This signal represents a start-drive command of the driver. A signal of this kind can, for example, be a position signal of an accelerator pedal, an output signal of a switch (for example, of a road speed controller switch) or of a switch of an adaptive road speed controller. If the standstill detection 113 detects a corresponding start-drive command of the driver, then a corresponding datum is outputted to the selection stage 110 or to the transmission control which again releases the parking brake, that is, the park position of the transmission for ensuring standstill. What is essential is that even after a drop in the supply voltage for the control units (drive switch off) the parking brake and/or the park position of the transmission remains latched so that it is ensured that there is no unintended releasing of the function which ensures the standstill of the vehicle.

In the preferred embodiment, the solution according to the invention is realized as a program of a microcomputer. An example of such a program is described with respect to the flowchart of FIG. 3. This program is run through at pregiven time intervals when the supply voltage is switched on.

Figure 3:
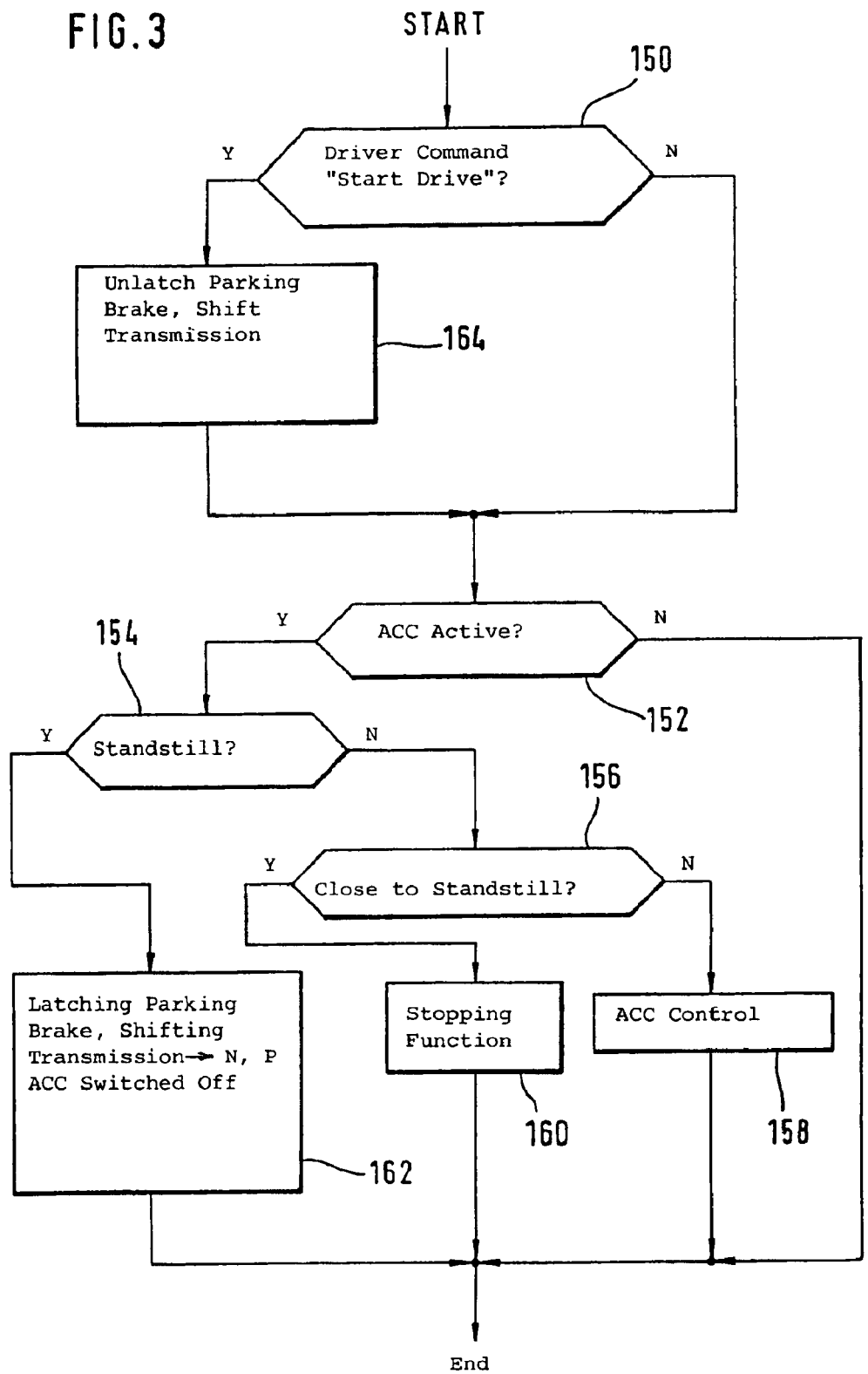
FIG. 3 shows the solution of the invention with respect to a flowchart which sketches a program which runs in a microprocessor of the control unit.

In a first step 150, a check is made as to whether a driver command to start driving the vehicle is present. In the preferred embodiment, this start driving command is determined on the basis of a quantity, which represents the position of the accelerator pedal, when the accelerator pedal is deflected from a release state into an actuated state. In addition, switching signals can be provided which signalize a start drive command. For example, switching elements activate an adaptive or a conventional road speed controller. The consideration of the clutch lever position signals and transmission lever position signals is likewise advantageous in some embodiments. If no such start drive command is present, a check is made in step 152 as to whether the adaptive road speed controller ACC is active. If this is not the case, then the program of FIG. 3 is ended and is run through anew at pregiven times. If step 152 yields that the adaptive road speed controller is active, then, in step 154, a check is made as to whether the vehicle is at standstill. This is carried out on the basis of an extrapolation of the speed trace as in the state of the art. If this is not the case, then a check is made in accordance with step 156 as to whether the road speed has dropped below a specific limit value, that is, whether the vehicle is on the way to standstill. If this is not the case, then, according to step 158, the initially described control is carried out in the context of an adaptive road speed controller (ACC); otherwise, a stopping function is initiated as described in the state of the art. If step 154 yields that the vehicle is at standstill, then, according to step 162, a braking force is built up at at least one of the wheel brakes in order to provide preparation of a parking brake function or an electrically controllable parking brake is actuated and, if required, the transmission is switched into the neutral position after a predetermined time. In lieu of the neutral position or in an advantageous embodiment, the transmission is switched into the park position when standstill is detected. Furthermore, the adaptive road speed controller is switched off. The subprogram is ended after the steps 162, 160 or 158 and then repeated at a pregiven time. If step 150 has yielded that a start drive command is present, then, according to step 164, the parking brake is released and/or the park position or neutral position of the transmission is disabled. Thereafter, the program continues with step 152.

If, after step 162, the supply voltage for the control unit is switched off, then the parking brake and/or the park position of the transmission is latched until a start drive command of the driver is detected in accordance with step 150 after the supply voltage is switched on again. In this way, standstill is guaranteed which would not lead to an unintended release of the parking brake and/or of the park position of the transmission.

The operation described with respect to FIG. 3 is made clearer on the basis of the time diagrams of FIG. 4. FIG. 4a shows the time trace of the road speed VFZ and FIG. 4b shows the time-dependent trace of the supply voltage U and FIG. 4c shows the time-dependent trace of the parking brake force FFB. FIG. 4d shows a signal, which represents the state of the transmission, especially whether the transmission has assumed the park or neutral position; whereas, FIG. 4e shows a two-value signal which represents the presence of a start drive command AW.

An operating situation is assumed wherein the vehicle is braked until standstill. This can take place either via a road speed controller as described in the preferred embodiment or via a corresponding brake actuation of the driver. At time point T0, the road speed (see FIG. 4a) could have dropped so far that the standstill of the vehicle is detected. Accordingly, at time point T0, a parking brake force is built up in accordance with FIG. 4c. In one embodiment, after an elapse of a specific time, the transmission is switched into the neutral position or the park position at time point T1 in accordance with FIG. 4d. In another embodiment, the park position of the transmission is assumed immediately at time point T0 or the park position is switched at time point T0 in lieu of the parking brake force buildup. At time point T2, the supply voltage U of the control unit is switched off (see FIG. 4b). The parking brake force and the transmission state are maintained (see FIG. 4c, FIG. 4d). At time point T3, the supply voltage is again switched on. A start drive command is detected at time point T4 so that there is a movement out of the transmission state and/or the parking brake force is reduced. The parking brake force drops to zero, the transmission leaves the park or neutral position. According to FIG. 4a, the vehicle picks up speed and drives off.

What is claimed is:

1. A method for ensuring standstill of a trailing vehicle in combination with an adaptive road speed controller of the trailing vehicle with said adaptive road speed controller functioning to adjust a distance between the trailing vehicle and a leading vehicle traveling directly ahead of the trailing vehicle, the trailing vehicle including a drive train incorporating an automatic transmission which provides and interrupts a force flow in the drive train, the method comprising the steps of:

measuring at least the distance of said trailing vehicle to said leading vehicle;

activating an engine control or a braking control of said trailing vehicle in dependence upon said distance and a desired value so that said trailing vehicle can be braked to standstill;

building up and/or maintaining a braking force in the manner of a parking brake function when said standstill of said trailing vehicle is detected;

interrupting the force flow in the drive train of said trailing vehicle by controlling said automatic transmission into a neutral position or a park position;

detecting a resume drive command of the driver when an operator-controlled element is actuated;

disengaging said parking brake function and controlling said automatic transmission out of said neutral position or said park position when said resume drive command is detected; and, activating said adaptive road speed controller in response to an actuation of said operator-controlled element by the driver and automatically effecting a resumed drive of said trailing vehicle utilizing said adaptive road speed controller.

2. The method of claim 1, wherein said trailing vehicle includes a supply voltage unit for supplying a supply voltage and electrical systems, the method comprising a further step of maintaining the parking brake braking force even when the supply voltage for the electrical systems of the trailing vehicle is switched off.

3. The method of claim 1, wherein said trailing vehicle includes a supply voltage and an electrical system, the method comprising a further step of maintaining the neutral position or the park position of the transmission when the supply voltage for the electrical systems of the trailing vehicle is switched off; and, only then leaving the position of the transmission when the resume drive command of the driver is recognized.

4. The method of claim 1, comprising a further step of interrupting the force flow after a predetermined time has elapsed after detection of standstill.

5. An arrangement for ensuring standstill of a trailing vehicle in combination with an adaptive road speed controller of the trailing vehicle with said adaptive road speed controller functioning to adjust a distance between the trailing vehicle and a leading vehicle traveling directly ahead of the trailing vehicle, the trailing vehicle including a drive train incorporating an automatic transmission which provides and interrupts a force flow in the drive train, the arrangement comprising a control unit which executes the following steps:

measuring at least the distance of said trailing vehicle to said leading vehicle;

activating an engine control or a braking control of said trailing vehicle in dependence upon said distance and a desired value so that said adaptive road steed controller is deactivated and said trailing vehicle can be braked to standstill;

building up and/or maintaining a braking force in the manner of a parking brake function when said standstill of said trailing vehicle is detected;

interrupting the force flow in the drive train of said trailing vehicle by controlling said automatic transmission into a neutral position or a park position;

activating said adaptive road speed controller in response to an actuation by the driver of an operator-controlled element;

detecting a resume drive command of the driver when said operator-controlled element is actuated;

disengaging said parking brake function and controlling said automatic transmission out of said neutral position or said park position when said resume drive command is detected; and, automatically effecting a resumed drive of said vehicle utilizing said adaptive road speed controller.

6. The arrangement of claim 5, wherein said operator-controlled element is a switch of the adaptive road speed controller.

7. A method for ensuring standstill of a trailing vehicle in combination with an adaptive road speed controller of the trailing vehicle with said adaptive road speed controller functioning to adjust a distance between the trailing vehicle and a leading vehicle traveling directly ahead of the trailing vehicle, the method comprising the steps of:

measuring at least the distance of said trailing vehicle to said leading vehicle and the speed of said trailing vehicle;

activating an engine control or a braking control of said trailing vehicle in dependence upon said distance and a desired value so that said adaptive road speed controller is deactivates and said trailing vehicle can be braked to standstill;

building up and/or maintaining a braking force in the manner of a parking brake function when said standstill of said trailing vehicle is detected;

detecting a resume drive command of the driver when an operator-controlled element is actuated;

activating said adaptive road speed controller in response to actuation by the driver of said operator-controlled element;

disengaging said parking brake function when said resume drive command is detected; and, automatically effecting a resumed drive of said trailing vehicle and controlling the engine control or the braking control of said trailing vehicle in dependence upon said distance and speed of said trailing vehicle utilizing said adaptive road speed controller.

8. An arrangement for ensuring standstill of a trailing vehicle in combination with an adaptive road speed controller of the trailing vehicle with said adaptive road speed controller functioning to adjust a distance between the trailing vehicle and a leading vehicle traveling directly ahead of the trailing vehicle, the arrangement comprising a control unit which executes the following steps:

measuring at least the distance of said trailing vehicle to said leading vehicle and the speed of said trailing vehicle;

activating an engine control or a braking control of said trailing vehicle in dependence upon said distance and a desired value so that said adaptive road speed controller is deactivated and said trailing vehicle can be braked to standstill;

building up and/or maintaining a braking force in the manner of a parking brake function when said standstill of said trailing vehicle is detected;

detecting a resume drive command of the driver when an operator-controlled element is actuated;

activating said adaptive road speed controller in response to an actuation by the driver of said operator-controlled element;

disengaging said parking brake function when said resume drive command is detected; and, automatically effecting a resumed drive of said trailing vehicle and controlling the engine control or the braking control of said trailing vehicle in dependence upon said distance and speed of said trailing vehicle utilizing said adaptive road speed controller.

* * * * *

UNITED STATES PATENT AND TRADEMARK OFFICE
CERTIFICATE OF CORRECTION

PATENT NO. : 6,878,096 B1
DATED : April 12, 2005
INVENTOR(S) : Hermann Winner and Albrecht Irion It is certified that error appears in the above-identified patent and that said Letters Patent is hereby corrected as shown below:

Column 7,
Line 46, delete "steed" and insert -- speed -- therefor.

Column 8,
Line 16, delete "deactivates" and insert -- deactivated -- therefor.

Signed and Sealed this

Fourteenth Day of June, 2005

JON W. DUDAS
*Director of the United States Patent and Trademark Office*